US007373951B2

(12) United States Patent
Gossett et al.

(10) Patent No.: US 7,373,951 B2
(45) Date of Patent: May 20, 2008

(54) CONTROL VALVE HAVING "C" SEAL

(75) Inventors: James L. Gossett, State Center, IA (US); William V. Fitzgerald, Melbourne, IA (US); Raymond W. Micheel, Gilman, IA (US); Donald Sanders, Atlanta, GA (US)

(73) Assignee: Fisher Controls International LLC, St. Louis, MO (US)

( * ) Notice: Subject to any disclaimer, the term of this patent is extended or adjusted under 35 U.S.C. 154(b) by 113 days.

(21) Appl. No.: 10/935,067

(22) Filed: Sep. 7, 2004

(65) Prior Publication Data

US 2006/0048826 A1 Mar. 9, 2006

(51) Int. Cl.
*F16K 11/07* (2006.01)
(52) U.S. Cl. .......................... 137/625.33; 137/625.39; 277/647
(58) Field of Classification Search ............. 137/625.3, 137/625.33, 625.37, 625.38, 625.39, 375; 277/647, 652, 653, 626
See application file for complete search history.

(56) References Cited

U.S. PATENT DOCUMENTS 4,108,210 A 8/1978 Luthe et al.
4,669,702 A * 6/1987 Tripp ........................ 251/210
6,302,402 B1 * 10/2001 Rynders et al. ............. 277/530
6,325,101 B1 12/2001 Stoll et al.
6,997,211 B2 * 2/2006 Alman et al. .......... 137/625.33

FOREIGN PATENT DOCUMENTS

EP 0573999 A1 12/1993

OTHER PUBLICATIONS

International Search Report received in International (PCT) Application PCT/US2005/028712, issued Dec. 8, 2005.
Written Opinion for Application PCT/US2005/028712, issued Dec. 8, 2005.

* cited by examiner

*Primary Examiner*—John Fox
(74) *Attorney, Agent, or Firm*—Marshall, Gerstein & Borun LLP

(57) ABSTRACT

A control valve having a shiftable valve plug includes a valve body having an inlet, an outlet, a flow passage extending between the inlet and the outlet, and defining a longitudinal axis, a generally cylindrical valve cage disposed within the valve body and sized to receive the valve plug, with the valve cage including at least one aperture comprising at least a portion of the flow passage, a portion of the valve cage disposed adjacent a portion of the valve body at an interface. A seal having a C-shaped cross section is provided and is disposed at the interface between the valve cage and the valve body, and a retainer is disposed adjacent the interface and positioned to secure the seal against movement along the longitudinal axis.

28 Claims, 6 Drawing Sheets

CONTROL VALVE HAVING "C" SEAL

FIELD OF THE INVENTION

The present invention relates generally to control valves having axially moveable valve plugs disposed within a cylindrical cage.

BACKGROUND OF THE INVENTION

Control valves for controlling the flow of high pressure fluids and/or gases in a process system are generally well known in the art. In many applications, such control valves include a generally cylindrical valve plug that is movably disposed within a cage. The cage is mounted within the valve body so as to be disposed in the flow path between the inlet of the valve and the outlet of the valve. The cage typically includes, for example, a plurality of perforations. The valve plug may be positioned in a first position in which the valve plug blocks the perforations in the valve cage such that flow of process fluid through the valve is prevented. The valve may be shifted using, for example, a valve actuator, such that the valve plug is moved within the cage to a position in which at least some of the perforations are uncovered, such that flow of process fluid through the valve is permitted.

As is known, a control valve is typically provided with one or more seals to prevent leakage. For example, a seal is typically provided between the valve plug and the valve cage. Additionally, a seal is typically provided between the valve cage and the body of the valve. Due to temperature fluctuations, vibration, and/or other environmental considerations, adequate sealing of the various valve components may present challenges.

Accordingly, novel features in the construction and/or operation of control valves and their associated components may be desired.

DETAILED DESCRIPTION OF THE PREFERRED EMBODIMENTS

The embodiments described herein are not intended to be exhaustive or to limit the scope of the invention to the precise form or forms disclosed. Instead, the following embodiments have been described in order to best explain the principles of the invention and to enable others skilled in the art to follow its teachings.

Figure 1:
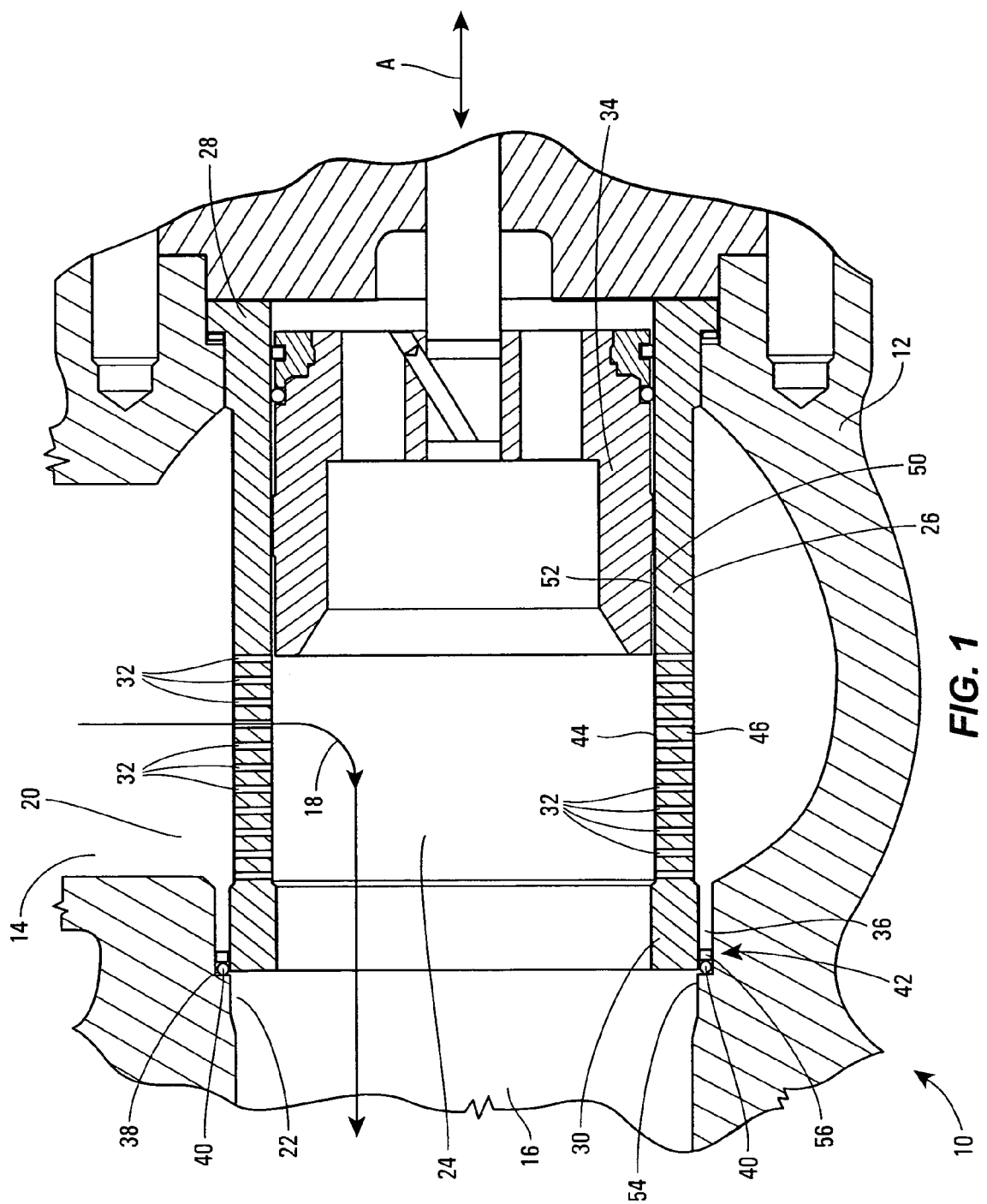
FIG. 1 is cross-sectional view of a control valve assembled in accordance with the teachings of a first disclosed example of the present convention and employing a "C" seal.

Referring now to FIG. 1 of the drawings, a control valve assembled in accordance with the teachings of a first disclosed example of the present invention is shown and is referred to by the reference numeral 10. The control valve 10 includes a valve body 12 having a first or inlet end 14 and a second or outlet end 16. A flow passage 18 is defined through the valve body 12 and includes an inlet passage 20, an outlet passage 22, and a control passage 24. A valve cage 26 is mounted within the valve body 12 of the control valve 10, with the valve cage 26 preferably being generally cylindrical and disposed such that at least a portion of the valve cage 26 is disposed in the control passage 24. The valve cage 26 includes a first end 28 and a second end 30. The valve cage 26 also includes a plurality of apertures 32, and a valve plug 34 is shiftably disposed in the valve cage 26. The valve cage 26 is positioned within the valve body 12 such that at least some of the apertures 32 are positioned in the flow passage 18.

The first end 28 of the valve cage 26 is, in the disclosed example, fixedly secured to the valve body 12, such as in a conventional manner. The second end 30 of the valve cage 26 engages the valve body 12 at an interface 36 generally defined by a seat 38 formed in the valve body 12 generally adjacent and/or disposed in the outlet passage 22. A seal 40 is disposed at the interface 36 formed between the second end 30 of the valve cage 26 and the seat 38 in the valve body 12. The seal 40 is held in place by a retainer assembly 42.

It will be appreciated that, in the disclosed example, the valve plug 34 is connected to a valve actuator, which may be conventional, such that the valve plug 34 is shiftable along a longitudinal axis A between a first position (in which the valve plug 34 would be shifted toward the left when viewing FIG. 1), and a second position (in which the valve plug 34 is shifted toward the right as is shown in FIG. 1). In the first position, the valve plug 34 blocks the apertures 32 in the valve cage 26, thereby preventing flow of a process fluid through the control valve 10. In the second position, with the valve plug 34 shifted toward the right as is shown in FIG. 1, the valve plug 34 is shifted away from the apertures 32 in the valve cage 26, thus opening some or all of the apertures 32, such that flow of a process fluid through the control valve 10 is permitted. It will also be understood that the inlet end 14 and the outlet end 16 of the control valve 10 may be switched such that the flow of a process fluid through the control valve 10 proceeds in the opposite direction of that shown.

The valve cage 26 is preferably a generally cylindrical structure having an inner surface 44 and an outer surface 46. The apertures 30 to extend between the inner surface 44 in the outer surface 46, with the apertures 30 taking a variety of forms as would be generally known in the art. The valve plug 34 is sized for a close fit within the interior of the valve cage 26, and preferably one or more seals 48 are provided at the interface 50 between an outer surface 52 of the valve plug 34 and the inner surface 44 the valve cage 26. The seals 48 may be of the type commonly employed in the art.

Figure 2:
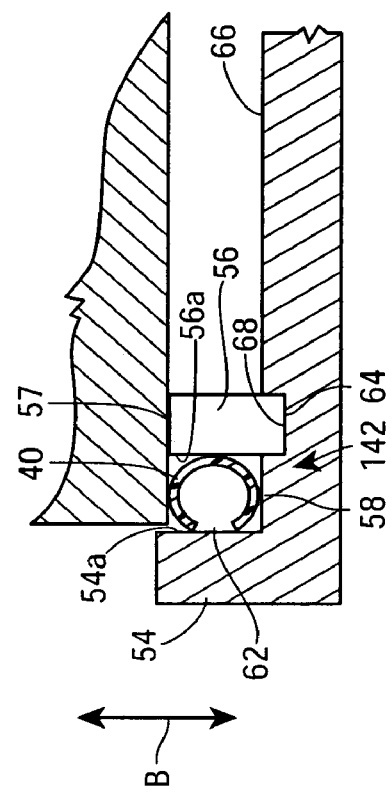
FIG. 2 is an enlarged fragmentary cross-sectional view taken about the circumscribed portion of FIG. 1 and illustrating the "C" seal disposed between the valve cage and the valve body.

Referring now to FIG. 2, the seal 40 is shown secured in place by the retainer assembly 42. In the exemplary embodiment of FIG. 2, the retainer assembly 42 includes an inwardly projecting flange 54 and a ring 56. It will be appreciated that the flange 54 may generally form at least a portion of the seat 38, with the flange 54 preferably extending circumferentially about the outlet passage 22. Similarly, the ring 56 extends circumferentially around the generally cylindrical valve cage 26. Typically, there will be a small gap 57 between the outer surface of the valve cage 26 and an inner surface of the ring 56. The flange 54 may take a variety of forms. For example, the flange may be integrally formed in the interior of the valve 10, or the flange 54 may be a separate ring or other suitable structure installed within the interior of the valve 10 in any suitable manner.

The flange 54 and the ring 56 preferably are spaced apart to form a gap 58, and the seal 40 is disposed in the gap 58. Preferably, the gap 58 is sized such that the seal 40 is secured within the gap 58 and abutting cooperating surfaces and/or faces 54a and 56a of the flange 54 and the ring 56, respectively, such that the seal 40 is restrained or otherwise secured against longitudinal movement parallel to the longitudinal axis A. Those of skill in the art will appreciate that the valve body 12 (or at least that portion 60 of the valve body disposed immediately adjacent to the seal 40) may have a first coefficient of thermal expansion, while the valve cage 26 may have a second coefficient of thermal expansion. Accordingly, in response to thermal variations, there may be detectable thermal expansion or retraction of the valve cage 26 relative to the valve body 12 in the longitudinal direction (i.e., parallel to the longitudinal axis A). It will also be appreciated that there may be detectable thermal expansion or retraction of the valve cage 26 relative to the valve body 12 in the transverse direction along an axis B (i.e., transverse or perpendicular relative to the longitudinal axis A).

Figure 3:
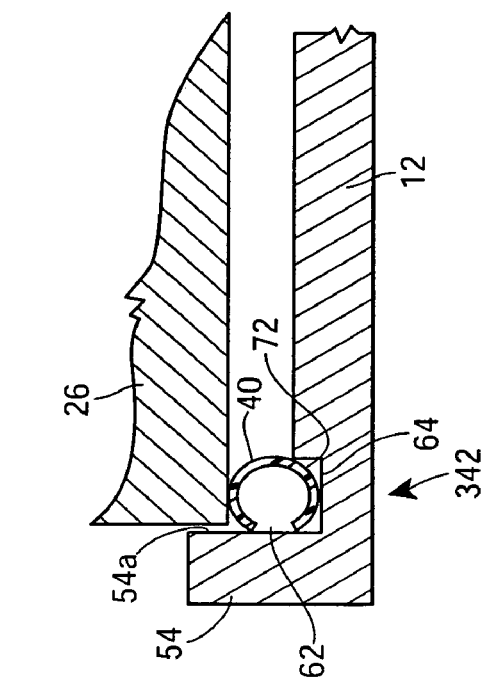
FIG. 3 is an enlarged fragmentary cross-sectional view similar to FIG. 2 but illustrating a "C" seal assembled in accordance with the teachings of a second disclosed example of the present invention.
Figure 4:
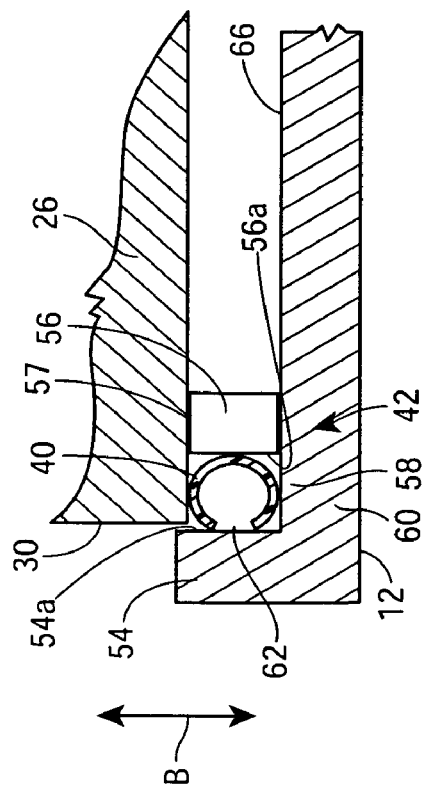
FIG. 4 is an enlarged fragmentary cross-sectional view similar to FIGS. 2 and 3 but illustrating a "C" seal assembled in accordance with the teachings of a third disclosed example of the present invention.

As can be seen in each of FIGS. 2-4, the seal 40 has a C-shaped cross-section. In each of FIGS. 2-4, the seal 40 is oriented such that an open part 62 of the "C" is facing the flange 54. As an alternative, the open part 62 may face the ring 56. Accordingly, the seal 40 may, in accordance with the disclosed example, resiliently deform in response to inward or outward movement of the valve cage 26 relative to the valve body 12 along a transverse axis B. It will be appreciated that this inward or outward movement may be caused by differences in the coefficients of thermal expansion between the valve cage 26 and the valve body 12, or due to other factors.

The ring 56 may be secured within the valve body in a number of ways. For example, the ring 56 may be threaded into the valve body 12, or the ring may be pinned, welded, secured using mechanical fasteners, adhesives or other bonding agents, secured using an interference fit, or expanded in place. Other forms of securing the ring 56 in place may also prove suitable. The ring 56 also may be a snap ring that is compressed, positioned, and then released. Still other forms or methods of providing and positioning the ring 56 may prove suitable.

Referring now to FIG. 3, a retainer assembly 142 assembled in accordance with the teachings of a second disclosed example of the invention may alternately take the form of a recessed channel 64 formed in an inner surface 66 of the valve body 12. In the example shown, the channel 64 has a generally rectangular-shaped cross-section, such that an outer portion 68 of the ring 56 is secured in the channel 64. The ring 56 may be secured in the channel 64 using any of the structures or methods discussed above with respect to FIG. 2, or by any other suitable structure or method.

Referring now to FIG. 4, a retainer assembly 242 assembled in accordance with the teachings of another disclosed example of the present invention may take the alternative form as shown. The retainer assembly 242 includes one or more indentations 70 formed on the inner surface 66 of the valve body 12. In the example shown in FIG. 4, three such indentations 70 are shown, with the indentations 70 spaced apart so as to define three different possible positions 70-1, 70-2, and 70-3 for the seal 40. In the embodiment of FIG. 4, the ring 56 may be dispensed with, with the seal 40 being secured in place, at least in part, by the indentation 70.

In the disclosed example, the indentation 70 is curved or otherwise shaped to correspond to the curvature of an outer portion 72 of the seal 40. With at least the outer portion 72 of the seal 40 disposed in the curved indentation 70, and with an outward force (parallel to the axis B) against the seal 40 provided by the valve cage 26, the seal 40 is suitably secured against longitudinal movement. As shown in FIG. 4, the seal 40 abuts the face 54a of the flange 54. An edge 70a of the indentations 70 may cooperate with the face 54a of the flange 54 to keep the seal 40 secured. As a still further alternative, the flange 54 may be dispensed with. Further, it will be understood that the seal 40 may be chemically secured and/or glued or bonded to the indentation 70, or secured by other suitable structures or methods.

Figure 5:
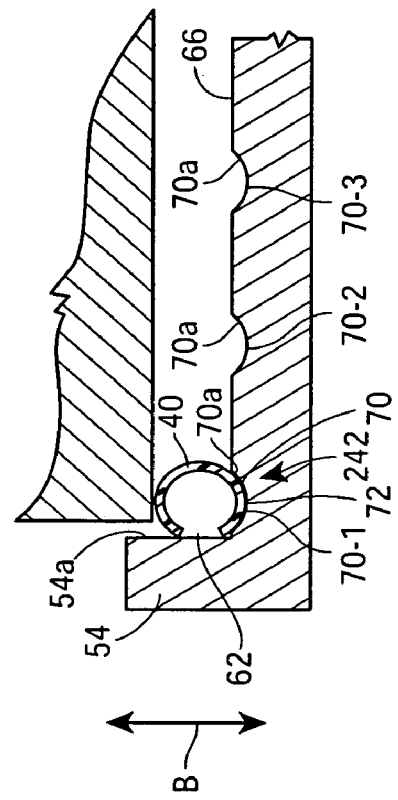
FIG. 5 is an enlarged fragmentary cross-sectional view similar to FIGS. 2-4 but illustrating a "C" seal assembled in accordance with the teachings of a fourth disclosed example of the present invention.

Referring now to FIG. 5, a retainer assembly 342 assembled in accordance with the teachings of another disclosed example of the invention may alternately take the form of a recessed channel 64 formed in an inner surface 66 of the valve body 12. In the example shown, the channel 64 has a generally rectangular-shaped cross-section, such that the outer portion 72 of the seal 40 is wedged or otherwise secured in the channel 64. The channel 64 is formed immediately or closely adjacent to the flange 54, and the ring 56 of FIGS. 2 and 3 is or may be dispensed with.

In accordance with one or more of the disclosed examples, it will be appreciated that typical valve bodies may be constructed of carbon or low-alloy steel. Typically, the seal 40 is hardened, and the retainer assembly 42, in accordance with one or more of these disclosed examples, may serve to secure the seal 40 relative to the valve body 12 so as to prevent or at least minimize wear and/or galling on the steel valve body 12.

In further accordance with one or more of the disclose examples, the valve cage 26 is constructed of any suitable material, such as the types of materials commonly employed in valve cage design and known to those of skill in the art. The valve cage 26 may include a coating, such as a nitride coating. Once again, in accordance with the disclosed example, the coating on the shelf cage 26 may serve to minimize and/or prevent galling between the seal 40 and the valve cage 26.

The seal 40 is commercially available and may be constructed of NO7718 alloy (alloy 718). Further, coatings may be added to the seal 40 itself, with the coatings ranging from a soft metal (for example, tin, silver, etc.), to a hard, wear-resistant material such as, for example, a chromium coating.

Those of skill in the art will appreciate that the teachings of the present invention need not be limited to the precise details of the control valve 10 described above. Instead, such a C-shaped seal 40 may be used in conjunction with one or more of the exemplary retaining assemblies 40 discussed above at other locations within a valve or in other structures where a spiral-wound gasket would typically be employed. For example, a C-shaped seal in conjunction with one or more of the above-described retaining assemblies 42 may be used on plug-seat applications, on piston rings, and in other applications where C-shaped seals are commonly used. A number of possible internal valve components or components meeting at appropriate interfaces in other possible structures may benefit from the exemplary forms of the invention disclosed herein.

Figure 6:
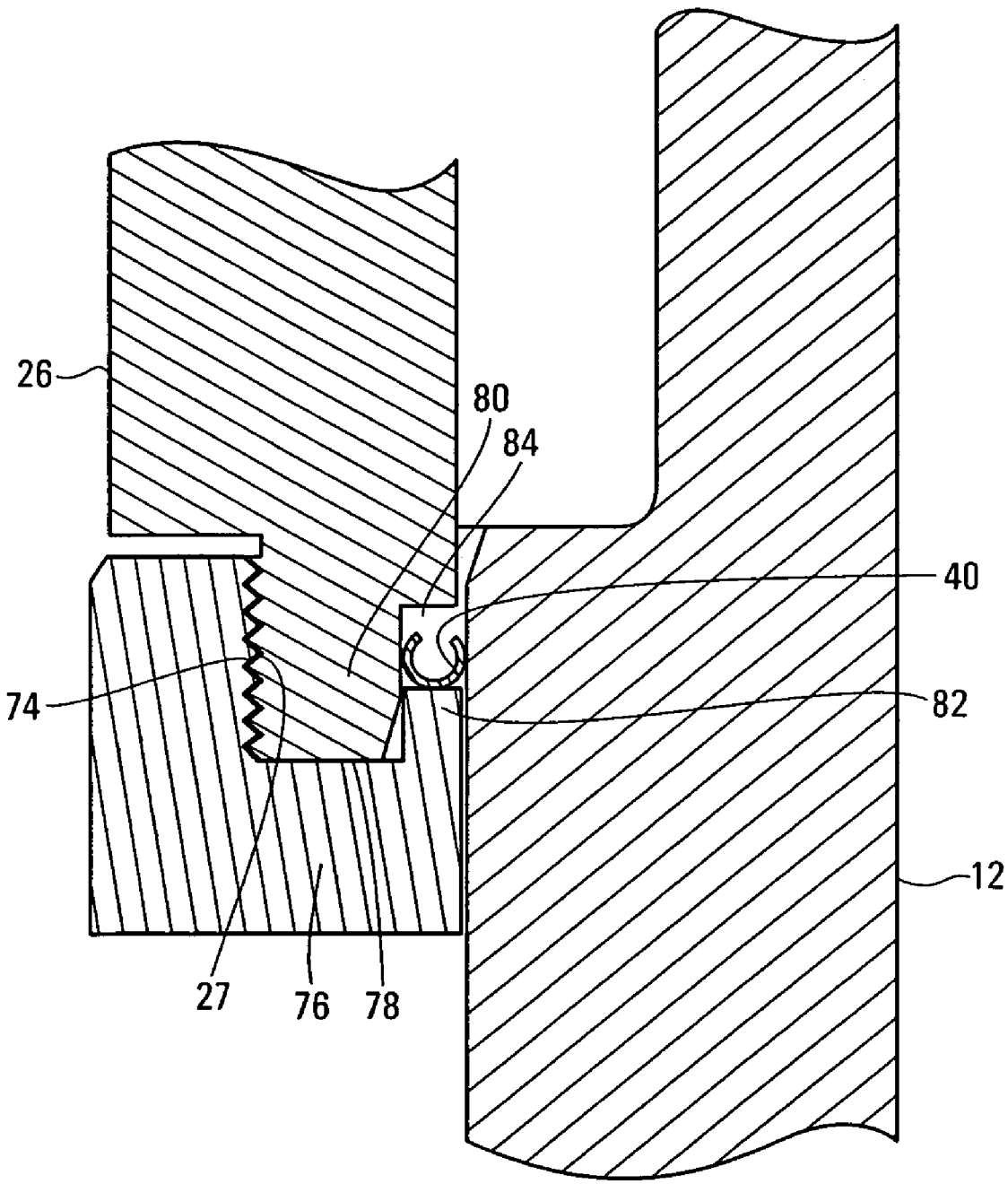
FIG. 6 is another enlarged fragmentary cross-sectional view of a "C" seal disposed in a valve body assembled in accordance with the teachings of another disclosed example of the present invention.

Referring now to FIG. 6, another exemplary structure for retaining the seal 40 within the valve body 12 is disclosed. The valve cage 26 includes a threaded portion 27 which engages corresponding threads 74 on a seat ring 76. The seat ring 76 includes an annular recess 78 sized to receive a protrusion 80 on the valve cage 26. The seat ring 76 also includes a raised annular platform 82. An outer portion of the valve cage 26 includes a notch 84, such that the seal 40 is retained in place by the platform 82, an outer surface of the notch 84, and by an inner surface of the valve body 12.

Figure 7:
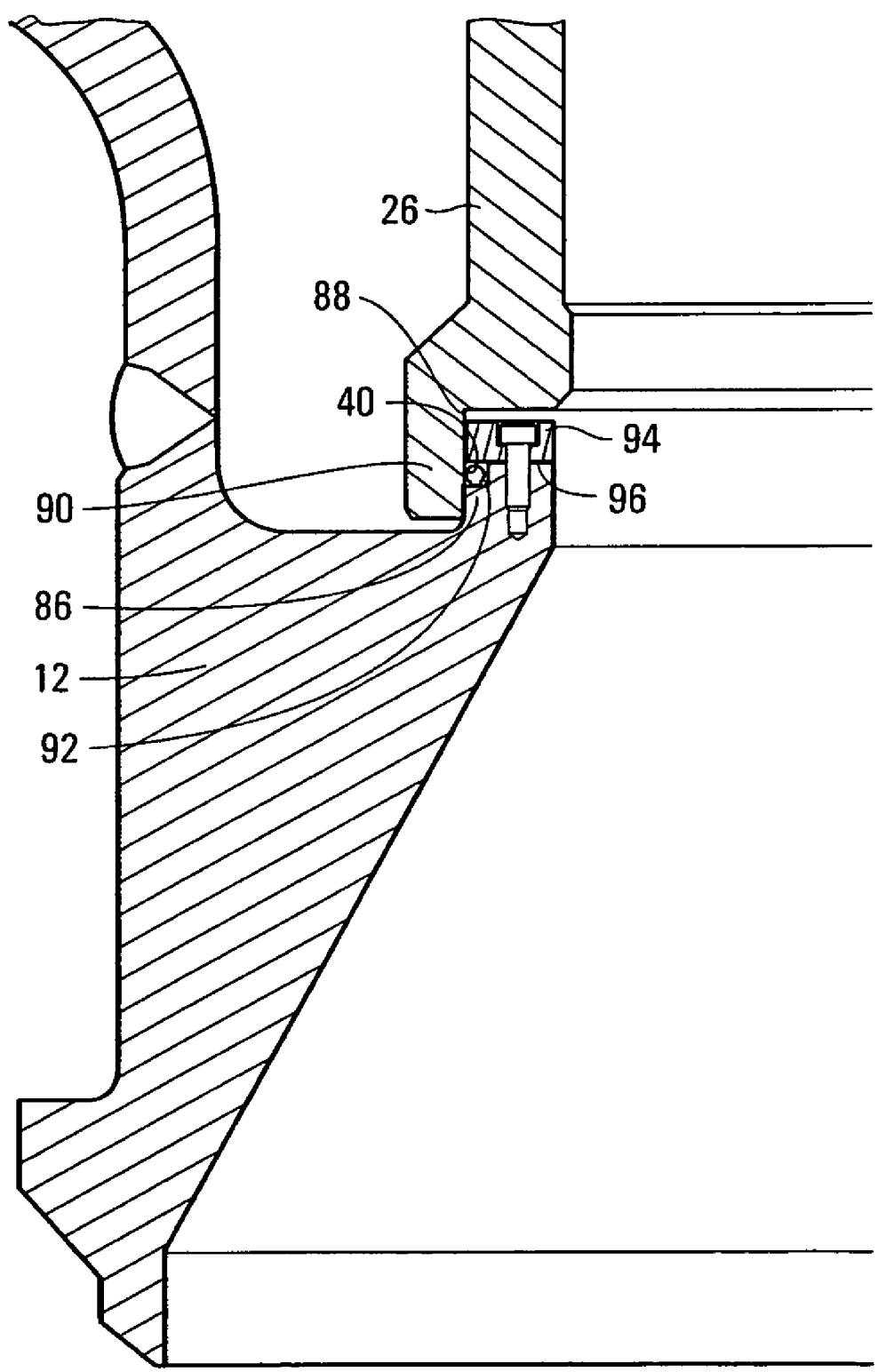
FIG. 7 is another enlarged fragmentary cross-sectional view of a "C" seal disposed in a valve body assembled in accordance at the teachings of still another disclosed example of the present invention.

Referring now to FIG. 7, another alternative embodiment for retaining the seal 40 is shown. The valve body 12 includes a raised annular platform 86, which is sized to fit within a receiving area 88 on the valve cage 26. In the disclosed example, the receiving area 88 is formed by a downwardly depending flange 90, which is disposed radially outward relative to the raised platform 86. The platform 86 includes a notch 92, which is sized to receive the seal 40. A retaining ring 94 is sized for attachment to a top surface 96 of the platform 86, such that the seal 40 is held in place by cooperating surfaces of the notch 92, the retaining ring 94, and an adjacent inner surface of the flange 90 of the valve cage 26. In this example, it will be appreciated that thermal expansion of the valve cage 26 may occur in the outward direction (i.e., toward the left when viewing FIG. 7). Due to the retaining structure illustrated in FIG. 7, thermal expansion in this outward direction will not cause crushing of the "C" shaped seal 40.

Figure 8:
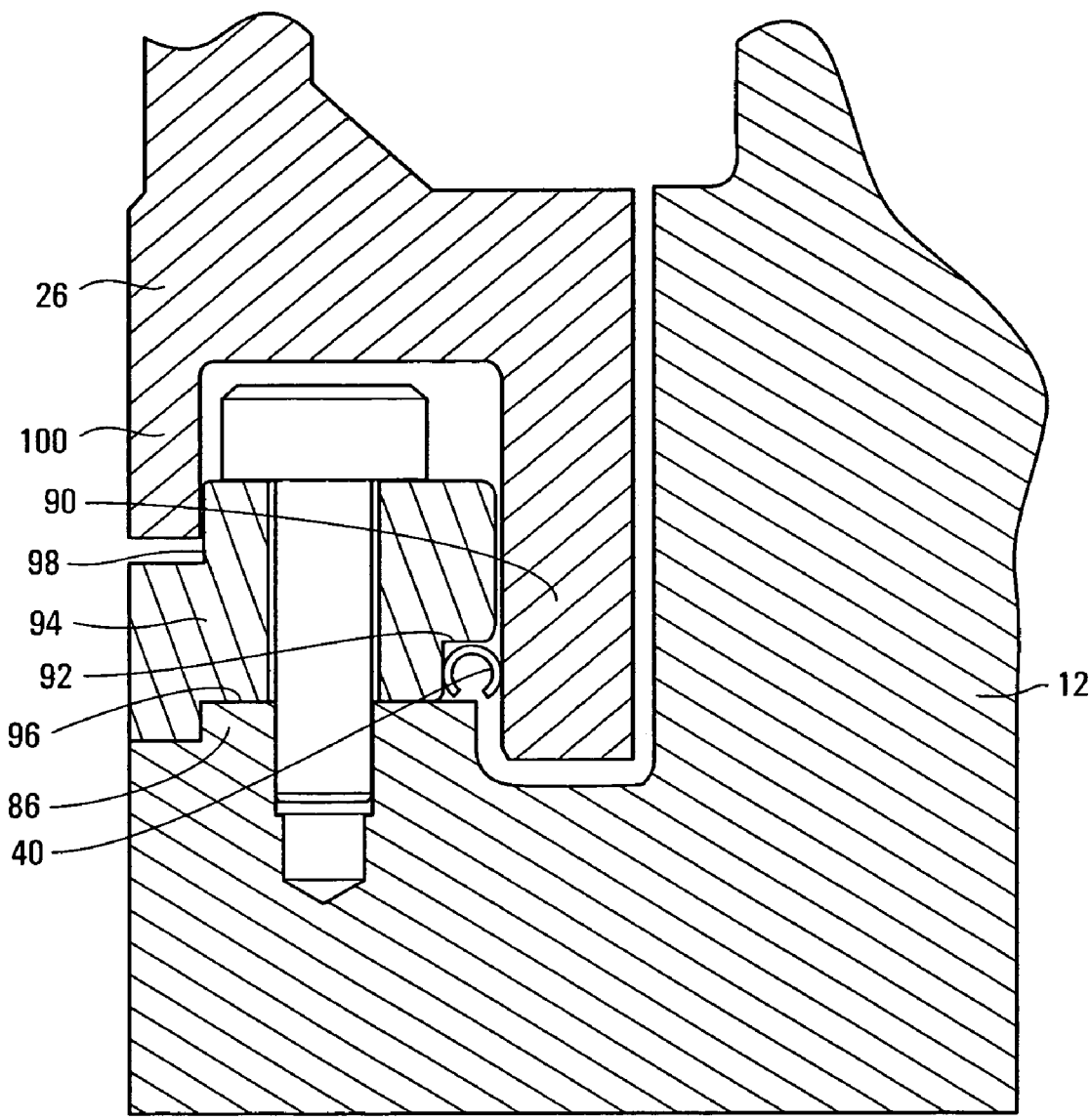
FIG. 8 is another enlarged fragmentary cross-sectional view of a "C" seal disposed in a valve body assembled in accordance at the teachings of still another disclosed example of the present invention.

Referring now to FIG. 8, yet another alternative construction for retaining the seal 40 is shown. The valve body 12 again includes the raised platform 86 having a top surface 96. However, the notch 92 is formed in the retaining ring 94. Accordingly, the seal 40 is held in place by cooperating surfaces formed by the notch 92 on the retaining ring 94, the top surface 96 of the raised platform 86, and by an inner surface of the downwardly depending flange 90 carried by the valve cage 26. Preferably, an inner portion of the retaining ring 94 may include another notch 98, which is sized to receive an inner downwardly depending flange 100 formed on the valve cage 26. Once again, in the embodiment of FIG. 8, thermal expansion of the valve cage 26 is in the outward direction (toward the right when viewing FIG. 8), which is away from the seal 40 which prevents or minimizes crushing of the seal 40. More specifically, when constructed in accordance with the disclosed example, it will be understood that thermal expansion will occur in the various components shown at different amounts and/or rates, all of which would be ascertainable to those of skill in the art. For example, when viewing FIG. 8, it will be understood that the flange 90 will expand toward the right, while the flange 100 will expand toward the left.

Further, it will be appreciated that the surface finish of the cage and the retainer are more easily controlled during manufacture to substantially eliminate erosion corrosion. Accordingly, in at least some applications it may be desirable to apply the appropriate surface finish and/or coating to the valve cage and/or the retainer as opposed to applying the same treatment to an inner surface of the valve body.

Figure 9:
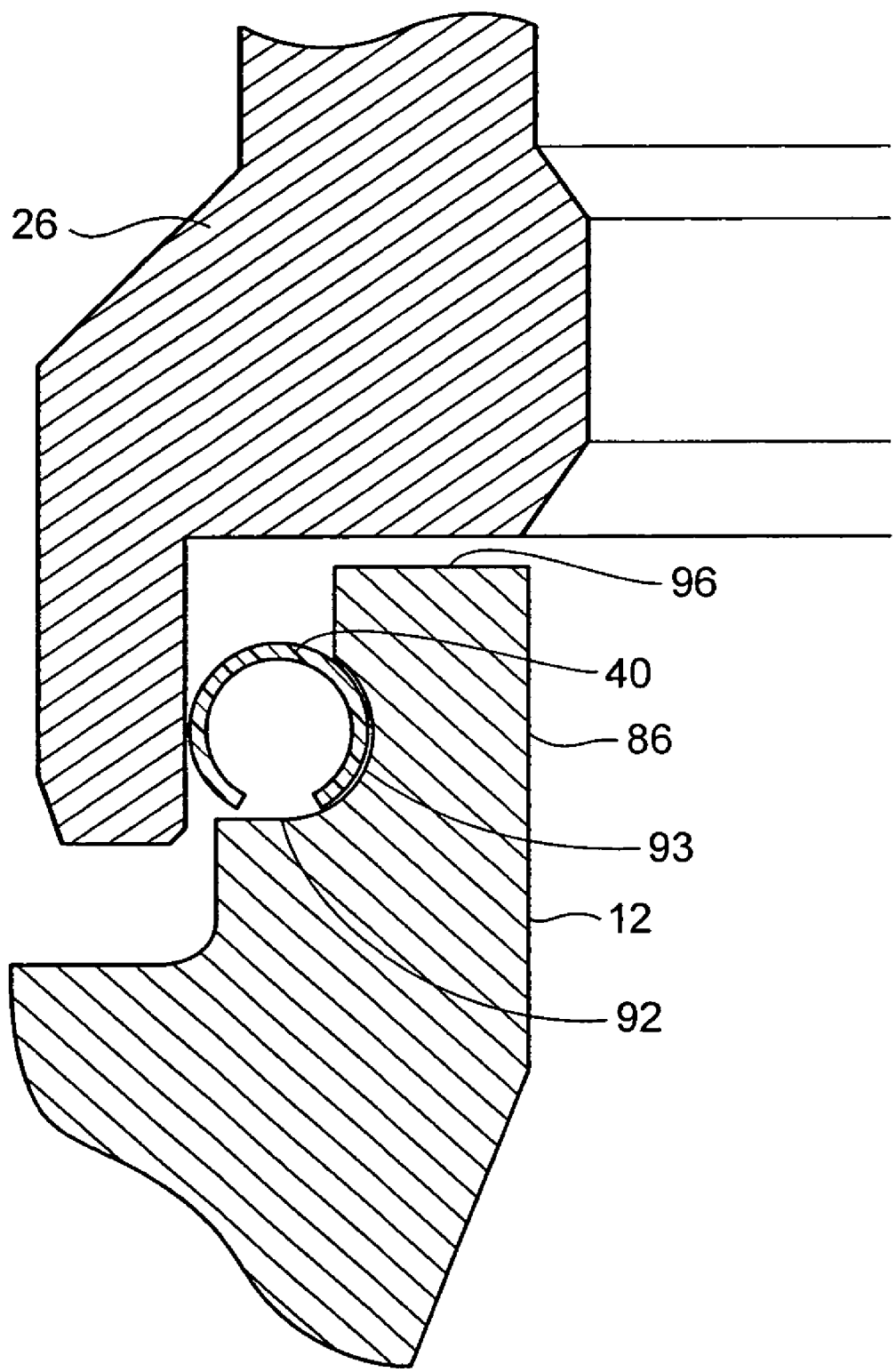
FIG. 9 is another enlarged fragmentary cross-sectional view of a "C" seal disposed in a valve body assembled in accordance at the teachings of still another disclosed example of the present invention.

Referring now to FIG. 9, a further alternative construction for retaining the seal 40 is shown. The valve body 12 again includes the raised platform 86 having a top surface 96. However, the notch 92 includes an annular recess 93 sized and shaped to receive an inner portion of the seal 40. Accordingly, the seal 40 is held in place by cooperating surfaces formed by the recess 93 disposed adjacent the notch 92 on the raised platform 86, and by the inner surface of the downwardly depending flange 90 carried by the valve cage 26. Once again, in the embodiment of FIG. 9, thermal expansion of the valve cage 26 is in the outward direction (toward the left when viewing FIG. 9), which is away from the seal 40 and which prevents or minimizes crushing of the seal 40 under thermal expansion.

The above-described details in the various Figures need not be mutually exclusive. That is, in accordance with the spirit and scope of the preferred examples disclosed herein, one may pick and choose various aspects of the several Figures and combine those selected aspects with other selected aspects illustrated and described with respect to different Figures.

Numerous modifications and alternative embodiments of the invention will be apparent to those skilled in the art in view of the foregoing descriptions. Accordingly, these descriptions are to be construed as illustrative only and are for the purpose of teaching those skilled in the art the best mode or modes presently contemplated for carrying out the invention. The details of the structure or structures disclosed herein may be varied substantially without departing from the spirit of the invention, and the exclusive use of all modifications which come within the scope of the appended claims, either literally or under the doctrine of equivalents, is reserved.

What is claimed:

1. A control valve comprising:
    a valve body having an inlet,
    an outlet, a flow passage extending between the inlet and the outlet, and defining a longitudinal axis, the valve body having a first thermal expansion coefficient;
    an internal valve component, at least a portion of which is fixed against displacement relative to the valve body, the valve component having a second thermal expansion coefficient different than the first thermal expansion coefficient;
    a seal having a C-shaped cross section and the seal contacting an outer surface of the valve component and an inner surface of the valve body, the C-shaped cross section of the seal includes an open part positioned to permit thermal expansion of the internal valve component relative to the valve body in a direction transverse to the longitudinal axis; and
    a retainer disposed immediately adjacent the seal and arranged to secure the seal against movement parallel to the longitudinal axis.

2. The control valve of claim 1, wherein the retainer includes an inwardly extending flange and an inwardly extending ring, the flange and the ring carried by the valve body and spaced apart to form a gap sized to receive the seal.

3. The control valve of claim 2, wherein the ring comprises a snap ring disposed in a recessed channel formed on an inner surface of the valve body.

4. The control valve of claim 1, wherein the retainer comprises a recessed formation formed in the inner surface of the valve body and sized to engage at least a portion of the seal.

5. The control valve of claim 4, wherein the retainer further includes an inwardly extending flange carried by the valve body, and wherein the recessed formation is disposed immediately adjacent the flange.

6. The control valve of claim 1, wherein the retainer includes a plurality of spaced apart indentations defined on an inner surface of the valve body, each of the indentations sized to receive a portion of the seal, a first one of the indentations defining a first seat location and a second one of the indentations defining a second seat location.

7. The control valve of claim 1, wherein at least one of the internal component and the seal includes a coating adjacent the interface.

8. The control valve of claim 7, wherein the coating on the seal comprises a soft metal coating.

9. The control valve of claim 7, wherein the coating on the seal comprises a hardened coating.

10. The control valve of claim 1, wherein a surface of the internal component includes a coating and the seal includes a coating contacting the coating of the internal component, the coating of the internal component compatible with the coating of the seal.

11. The control valve of claim 1, wherein the seal is in sealing engagement with the valve body and the internal valve component.

12. The control valve of claim 1, wherein the seal has a generally circular cross-section.

13. A control valve having a shiftable valve plug and comprising:
  a valve body having an inlet, an outlet, a flow passage extending between the inlet and the outlet, and defining a longitudinal axis;
  a generally cylindrical valve cage having at least a portion that is fixed within the valve body against displacement parallel to the longitudinal axis, the valve cage sized to receive the valve plug and including at least one aperture comprising at least a portion of the flow passage, a portion of the valve cage disposed adjacent a portion of the valve body at an interface;
  a seal having a C-shaped cross section, the seal disposed between and in contact with an outer surface of the valve cage and an inner surface of the valve body, the C-shaped cross section of the seal includes an open part oriented at the interface so as to accommodate temperature related expansion and retraction of the valve cage relative to the valve body; and
  a retainer disposed adjacent the interface and positioned to secure the seal against movement along the longitudinal axis.

14. The control valve of claim 13, wherein the retainer comprises at least one flange carried by the valve body.

15. The control valve of claim 13, wherein the retainer includes an inwardly extending flange carried by the valve body adjacent to the interface.

16. The control valve of claim 15, wherein the retainer includes a ring disposed on an inner surface of the valve body and spaced from the flange to form a gap, the seal disposed in the gap.

17. The control valve of claim 15, wherein an inner surface of the valve body includes an indentation sized to engage an outer portion of the seal.

18. The control valve of claim 13, wherein the retainer includes an indentation defined on an inner surface of the valve body and sized to engage an outer portion of the seal.

19. The control valve of claim 13, wherein the retainer includes a plurality of spaced apart indentations defined on an inner surface of the valve body, each of the indentations sized to receive an outer portion of the seal, a first one of the indentations defining a first seat location and a second one of the indentations defining a second seat location.

20. The control valve of claim 13, wherein the retainer includes a snap ring carried by an inner surface of the valve body.

21. The control valve of claim 20, wherein the snap ring is secured in a channel formed in the inner surface of the valve body.

22. The control valve of claim 13, wherein at least one of the valve cage and the seal includes a coating adjacent the interface.

23. The control valve of claim 22, wherein the coating on the seal comprises a soft metal coating.

24. The control valve of claim 22, wherein the coating on the seal comprises a hardened coating.

25. The control valve of claim 13, wherein an outer surface of the valve cage includes a coating and the seal includes a coating, the coating of the outer surface of the valve cage compatible with the coating of the seal.

26. The control valve of claim 13, wherein the seal is in sealing engagement with the valve body and the valve cage.

27. The control valve of claim 13, wherein the seal has a generally circular cross-section.

28. A control valve comprising:
  a valve body having an inlet, an outlet, a flow passage extending between the inlet and the outlet, and defining a longitudinal axis;
  a generally cylindrical valve cage fixed against movement within the valve body, except for movement due to thermal expansion and retraction of at least one of the valve body and the valve cage;
  a seal having a C-shaped cross section, the seal contacting an outer surface of the valve cage and an inner surface of the valve body, the C-shaped cross section of the seal including an open part oriented relative to the valve cage and valve body to accommodate the effects of the thermal expansion and retraction of the valve cage and the valve body; and
  a retainer positioned between the valve cage and the valve body to secure the seal against movement along the longitudinal axis.

* * * * *